May 25, 1965     E. J. SASS     3,184,849
MINI-CAM TRACER PLATE

Filed Nov. 21, 1962     5 Sheets-Sheet 1

INVENTOR.
Edward J. Sass
BY

May 25, 1965 E. J. SASS 3,184,849
MINI-CAM TRACER PLATE
Filed Nov. 21, 1962 5 Sheets-Sheet 3

INVENTOR.
Edward J. Sass

May 25, 1965     E. J. SASS     3,184,849
MINI-CAM TRACER PLATE

Filed Nov. 21, 1962     5 Sheets-Sheet 4

INVENTOR.
Edward J. Sass
BY

May 25, 1965  E. J. SASS  3,184,849
MINI-CAM TRACER PLATE
Filed Nov. 21, 1962  5 Sheets—Sheet 5

INVENTOR.
Edward J. Sass

3,184,849
MINI-CAM TRACER PLATE
Edward J. Sass, Los Alamos, N. Mex., assignor to the United States of America as represented by the United States Atomic Energy Commission
Filed Nov. 21, 1962, Ser. No. 239,387
6 Claims. (Cl. 33—23)

The present invention relates to a tracer plate and, more specifically, to a simple device for tracing configurations, at least part of which are of constant radius.

In presently used methods radial or dimensional changes for a work piece are accomplished on a tracer lathe by the use of a cam which is followed by a control stylus. Movement of the control stylus induces a corresponding movement in the cutting tool and therefore the dimensions and shape of the work piece may be controlled by the configuration of the cam. The use of these cams involves several disadvantages, one being that, for all but the simplest shapes, the manufacture of such a cam is relatively time consuming and expensive (since the cam must be accurate to the dimensional tolerance desired on the generated piece). It has also been found that when using such a cam the centering of the cutting tool involves a laborious trial and error procedure. In contrast, the mini-cam tracer plate allows generation of various radii tangent angle configurations to tolerances as close as .0002 inch by the simple adjustment of a pivoted tracer arm assembly. It can also be used in conjunction with simple cams to generate complex shapes.

The present invention is a device for controlling a tracer lathe in the generation of various radii tangent angle configurations and comprises a tracer plate mounted in a predetermined position with respect to the cutting tool and control stylus of said tracer lathe. A tracer arm assembly is adjustably and pivotally mounted on said tracer plate, said tracer arm assembly utilizing a rigid arm pivotally supported above said tracer plate. Control stylus guide means are mounted on the said rigid arm and engageable with the control stylus, said tracer arm assembly being adapted to allow adjustable positioning of said control stylus guide means precisely at a predetermined distance from the pivot point. Stopping means are adjustably mounted on said tracer plate, said stopping means being adapted to arrest rotation of said traced arm assembly at a predetermined point.

The tracer plate device is adapted to be used with any standard tracer lathe equipped with a control stylus and normally used with cams. The only modification involved is that the tracer plate device is used in place of the cam.

Figure 1:
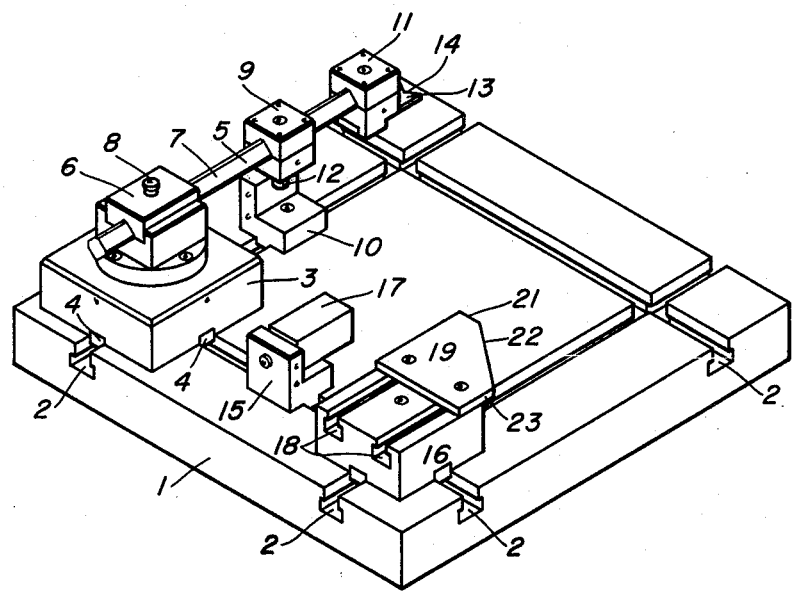
FIGURE 1 is an isometric view of the mini-cam tracer plate.
Figure 2:
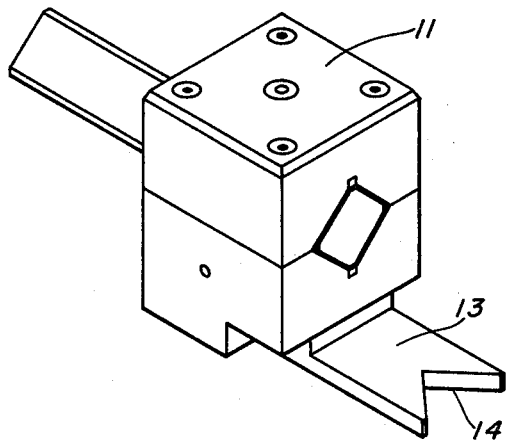
FIGURE 2 is an enlarged view of the stylus guide block of FIGURE 1 rotated clockwise 90°.

Referring to FIGURE 1, tracer plate 1 has machined into its surface a series of perpendicular slots 2 of identical inverted T-shaped cross section. Mounted in the slots is a bearing pivot block 3. The bearing pivot block 3 is shown locked into position at the intersection of two slots by removable keys 4. Pivotally mounted on bearing pivot block 3 is a tracer arm assembly 5 consisting of a clamping block 6 through which is mounted a pivot arm 7, a movable stop block 9 mounted on pivot arm 7, and a stylus guide block 11 mounted on the free end of pivot arm 7. The clamping block 6 is pivotally mounted on bearing pivot block 3 and secured thereto by a pivot pin 8. Projecting downward from stop block 9 is a machined cylindrical rod 12, the axis of rod 12 being perpendicular and in precise alignment with the center line of pivot arm 7. The precise alignment of arm assembly 5 is accomplished by the use of centering block 10. FIGURE 2 shows that incorporated in stylus guide block 11 is a stylus guide plate 13 provided with a notch 14 to receptively engage the tracer lathe control stylus (not shown). As shown by FIGURE 1, there can also be adjustably mounted on tracer plate 1 a gage stop block 15 and a cam block 16. The gage stop block 15 is adapted for the mounting thereon of gage blocks 17. The cam block 16 is provided with slots 18 for adjustable mounting of a cam, such as cam 19. The particular cam shown has three functional edges, step generating edge 21, conical section generating edge 22, and cylindrical section generating edge 23.

Figure 3:
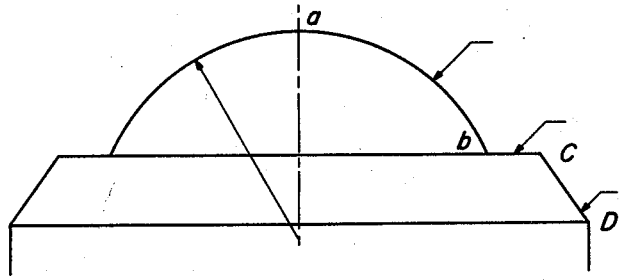
FIGURE 3 is a section as shown in elevation of the work piece configuration as traced out by the tracer plate when set up as shown in FIGURE 1.

When the particular combination of cam and stop blocks shown in FIGURE 1 is used, a complex shape will be generated as follows. When the tracer plate 1 is mounted upon a tracer lathe bed with the arm in the position shown, the control stylus engaged with the notch 14 in stylus guide plate 13, and with the lathe feed adjusted to move the lathe cutting tool towards the left (as known in the art), activation of the lathe feed system will cause the stylus to exert a force upon the stylus guide plate 13, thereby causing the tracer arm assembly 5 to pivot in a clockwise direction about pivot pin 8. The stylus guide block 11 and the stylus then transcribing a circular arc, the lathe cutting tool being in turn controlled in accordance with the movement of the stylus, generates a convex hemispherical shape (*ab* of FIGURE 3) until the arm pivots a sufficient amount to cause the control stylus to contact step generating edge 21 of cam 19. As the stylus contacts step generating edge 21, of cam 19, the stylus becomes disengaged from guide plate 13, thereby arresting all circular motion of stylus and tracer arm assembly 5. The tracer arm assembly 5, having no further function, is now out of the way and exerts no further control upon the stylus. When the control stylus is arrested by the step generating edge 21 of cam 19, it immediately begins to move outwardly in a straight line across edge 21 (*bc* of FIGURE 3), in a straight line across the conical generating edge 22 (*cd* of FIGURE 3) and in straight line along cylindrical edge 23. This causes generation of a step connecting the hemispherical section with subsequent conical and cylindrical sections as is shown in elevation by FIGURE 3.

It is quite easy to set up the tracer plate for a particular job. For example, in setting up the tracer plate for the manufacture of the shape shown, the pivot of the tracer arm assembly is used as a reference point, the reference point being located at a relative position along the center line of the desired shape at a point determined by the radius of the hemispherical section. The tracer arm assembly 5 is then adjusted to position the control stylus, when it is engaged in notch 14 of stylus guide plate 13, at a distance from pivot pin 8 equal to the desired radius. This can be precisely accomplished through utilization of precision gage blocks since bearing pivot block 3 and stylus guide block 11 are carefully machined to predetermined dimensions. The necessary thickness of gage blocks are abutted against bearing pivot block 3 and the stylus guide block 11 slid into contact with the gage blocks and there locked into place.

Next the cam is positioned as follows: Stop block 9 is assembled on arm 7 and it and gage stop block 15 are adjusted so that they are approximately equidistant from pivot pin 8, and the proper thickness of gage blocks 17 are attached to gage stop block 15 to cause the control stylus to be relatively positioned exactly at the point of intersection between the hemispherical section and the ridge, when the rotation of tracer arm assembly 5 is arrested by the cylindrical rod 12 contacting the gage blocks 17 attached to gage stop block 15. The proper thickness of gage blocks 17 is easily determined since arm 7 acts as a modified sine bar. The distance between the centers of pivot pin 8 and cylindrical rod 12 can be set at a precise predetermined distance, usually five inches, and from this distance standard tables may be consulted to find the necessary thickness of blocks 17 in order that the control stylus will travel through only the desired arc. The tracer arm assembly 5 is momentarily secured in this position and cam 19 then positioned so that its step generating edge 21 is in contact with the control stylus at a distance from the intersection of edges 21 and 22 equal to the width of the desired step, and there locked into place. The thickness of gage blocks 17 is then reduced, or the gage blocks removed entirely, to allow the tracer arm assembly 5 to pivot past the point of engagement of the control stylus with step generating edge 21 of cam 19, thereby allowing disengagement of the control stylus from notch 14 in stylus guide plate 13. Centering of the cutting tool is a very simple operation with the present device, since tracer plate 1 (and therefore centering block 10) has been carefully positioned when the tracer plate is mounted so that when cylindrical rod 12 is placed against centering block 10, the tool is positioned at the desired center point.

It is apparent to a man skilled in the art that, from a consideration of the description and drawings, many modifications are possible without departure from the spirit and scope of the present invention. For example, the mini-cam tracer plate is suitable for use on known duplicating milling machines as well as tracer lathes. In such a case, the tracer plate device would enable the construction of a plurality of cam pieces without the laborious process of forming a master before such cams can be produced, as was formerly necessary.

It is also apparent that shapes consisting only of various radii tangent angle configurations can be produced without using a cam, requiring only readjustments of the effective length of the pivot arm 7 and relative adjustment of the stop blocks 9 and 15 in conjunction with gage blocks 17. The gage blocks 17 are adjusted to arrest the stylus at a position relative to the intersection between two tangent angle configurations at which time the necessary readjustments are made to cause generation of the new arc. It is clear that concave as well as convex hemispherical shapes can be generated merely by repositioning bearing pivot block 3 at a diagonally opposite position on tracer plate 1.

FIGURES 4 through 9 illustrate several setups of the tracer plate for tracing out various configurations of the work piece. In FIGURES 4 through 9 the stylus is represented as a small circle at the stylus guide plate 13.

Figure 4:
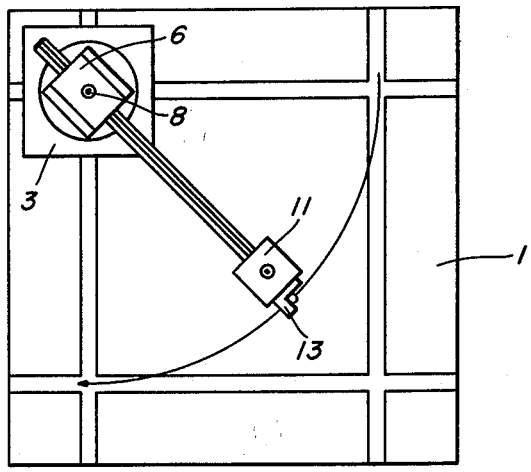
FIGURES 4 through 9 are top views of the tracer plate when adapted to trace out various configurations.

FIGURE 4 depicts the setup in which a convex hemispherical work piece may be generated. If a precise arcuate distance were desired then centering block 10, movable stop block 9, gage stop block 15, and gage blocks 17 could be utilized as shown in FIGURE 1.

Figure 5:
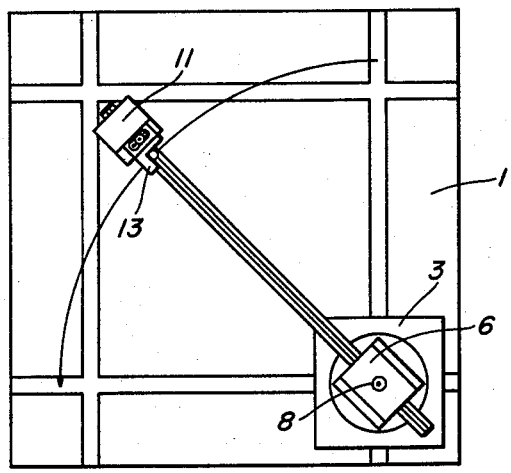

FIGURE 5 differs from FIGURE 4 whereby a concave hemispherical configuration may be attained. It is noted that the only change necessary from that of FIGURE 4 is to reposition bearing pivot block 3 at a diagonally opposite location on the tracer plate. Stylus guide block 11 and stylus guide plate 13 is inverted and reversed as shown.

Figure 6:
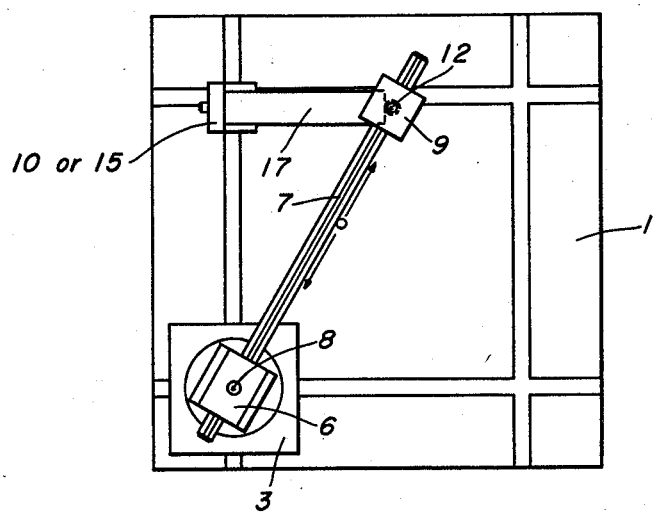

In FIGURE 6 the tracer plate is shown in a setup which enables the generation of conical "male or female" shapes simply by changing the directional rotation of spindle, using the sine bar principle for precise angle settings. As previously explained, the tracer arm assembly may be utilized as a modified sine bar by precisely measuring the distances between pivot pin 8 and cylindrical rod 12. Any desired angle may then be attained by the use of proper gage blocks. In this setup the stylus is not guided by a guide block and guide plate but rather moves freely along the edge of pivot arm 7 in order to generate a conical shape.

Figure 7:
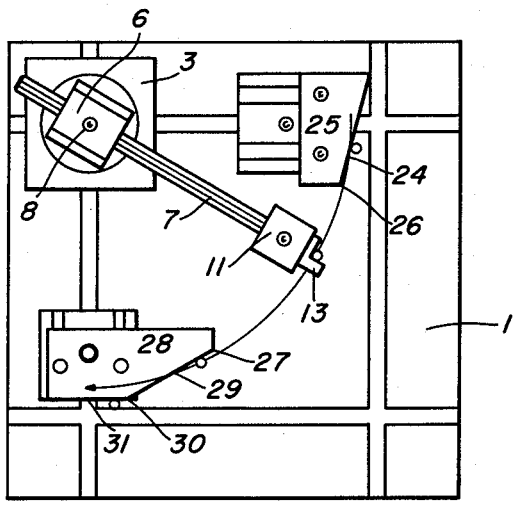

From a consideration of FIGURE 7, it is seen that two cams are used in conjunction with the tracer plate device. If the control stylus were initially positioned along the surface 24 of cam 25 the cutting tool will first generate an angle corresponding to that of 24. When point 26 is reached the stylus as guided by the tracer arm assembly will generate a constant radius until it reaches point 27 at cam 28. The control stylus will then disengage from stylus guide plate 13 and travel along surface 29 of cam 28. This will generate a corresponding angle on the work piece. When point 30 is reached the control stylus will travel along surface 31 thereby generating a cylindrical portion.

Figure 8:
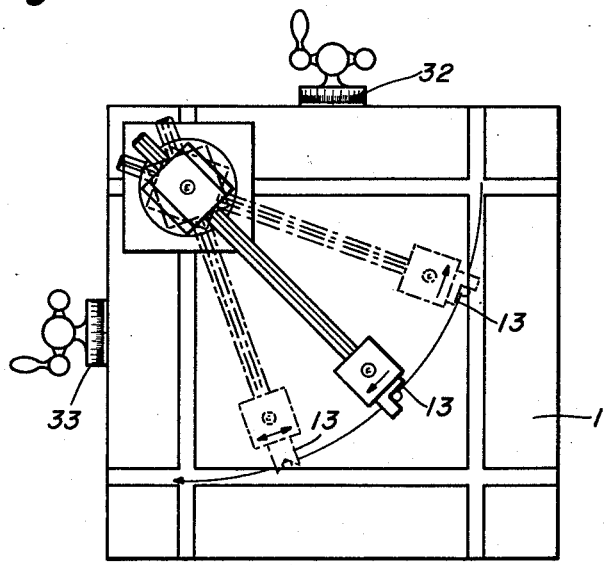

The tracer plate as set up in FIGURE 8 may be used to generate arcs of constant radius whereby the center may be offset any desired distance using the precision cross-slide dovetails 32 and 33. FIGURE 8 also illustrates various configurations of the stylus guide plate.

Figure 9:
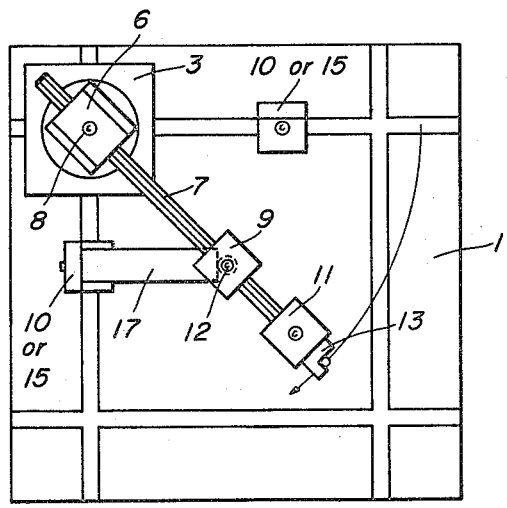

FIGURE 9 may be considered a modification of the tracer plate assembly of FIGURES 4 or 5 and 6. Either a convex or concave radius may be generated as in FIGURE 4 or 5. Since it is desired to use a predetermined stop, movable stop block 9 is arrested at this predetermined point by the contact of cylindrical rod 12 and gage blocks 17. In this case, as in that of FIGURE 6, the arm 7 and block 9 is used as a modified sine bar by which the length of gage blocks 17 is determined.

It is seen from the above that the mini-cam tracer plate is quite versatile. It may be used in the generation of any desired radial arc. It may be used as a standard sine bar plate. It may be used in conjunction with simple cams to generate complex shapes. It is also seen that the tracer plate requires relatively few and extremely simple adjustments in order to generate complex configurations.

What is claimed is:
1. A cam tracer plate device comprising:
   (a) a plate,
   (b) a tracer arm assembly adjustably and pivotally mounted on said plate,
   (c) said tracer arm assembly comprising a rigid arm pivotally mounted on said plate and control stylus guide means adjustably mounted on the rigid arm and engageable with a control stylus, and
   (d) cam means so placed on said plate as to continue surface generation on a workpiece after said cam means disengages the control stylus.

2. A cam tracer plate device comprising:
   (a) a plate,
   (b) a tracer arm assembly adjustably and pivotally mounted on said plate,
   (c) said tracer arm assembly comprising a rigid arm pivotally mounted on said plate and control stylus guide means adjustably mounted on the rigid arm and engageable with a control stylus,
   (d) stopping means mounted on said plate and adapted to arrest rotation of the tracer arm assembly, and
   (e) cam means so placed on said plate as to continue surface generation on a workpiece after disengaging the control stylus before the arm assembly rotates a sufficient amount as to encounter the stopping means.

3. A device for controlling a tracer lathe in the generation of various radii tangent angle configurations comprising:
   (a) a tracer plate mounted in a predetermined position with respect to the control stylus of said tracer lathe,
   (b) grooves of inverted T-shaped cross section in said tracer plate,
   (c) said tracer plate being of a square configuration and said grooves being parallel to the edges of said tracer plate, (d) a bearing pivot block mounted and movable in said grooves,
(e) a tracer arm assembly adjustably and pivotally mounted on said bearing pivot block,
(f) said tracer arm assembly comprising a rigid arm pivotally mounted on said tracer plate, a movable stop block adjustably mounted on said rigid arm, and control stylus guide means adjustably mounted on said rigid arm and engageable with said control stylus,
(g) stop blocks adjustably mounted in the grooves on said tracer plate and adapted to arrest rotation of the tracer arm assembly by contact with a portion of the movable stop block mounted on the rigid arm,
(h) a cam block adjustably mounted in the grooves on said tracer plate,
(i) and a cam plate mounted in grooves on said cam block and so placed on said tracer plate as to disengage the control stylus before the arm assembly rotates a sufficient amount to encounter the stop blocks and thereby continuing surface generation on the workpiece.

4. A cam tracer plate device comprising:
(a) a plate,
(b) grooves being provided in said plate,
(c) said grooves being of inverted T-shaped cross section,
(d) a tracer arm assembly,
(e) a bearing pivot block,
(f) said tracer arm assembly being pivotally mounted on said bearing pivot block, and said bearing pivot block being mounted and movable in said grooves,
(g) said tracer arm assembly comprising a rigid arm pivotally mounted on said plate and control stylus guide means adjustably mounted on the rigid arm and engageable with a control stylus,
(h) stopping means mounted on said plate and adapted to arrest rotation of the tracer arm assembly, and
(i) cam means so placed on said plate as to continue surface generation on a workpiece after disengaging the control stylus before the arm assembly rotates a sufficient amount as to encounter the stopping means.

5. The device of claim 4 wherein the said stopping means are mounted and movable in the said grooves.

6. The device of claim 5 wherein the cam means is mounted in grooves on a cam block, said cam block being mounted and movable in the plate grooves.

References Cited by the Examiner
UNITED STATES PATENTS 2,409,290  10/46  Lipp _____ 33—26
2,677,295  5/54   Schmidt _____ 33—23 X ISAAC LISANN, *Primary Examiner.*